(12) United States Patent
Nagao et al.

(10) Patent No.: US 9,233,356 B2
(45) Date of Patent: Jan. 12, 2016

(54) EXHAUST GAS PURIFICATION CATALYST AND PRODUCTION METHOD THEREOF

(71) Applicant: TOYOTA JIDOSHA KABUSHIKI KAISHA, Toyota-shi, Aichi-ken (JP)

(72) Inventors: Satoshi Nagao, Gotenba (JP); Naotaka Sawada, Fuji (JP); Yusaku Inatomi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/626,374

(22) Filed: Feb. 19, 2015

(65) Prior Publication Data

US 2015/0251165 A1  Sep. 10, 2015

(30) Foreign Application Priority Data

Mar. 5, 2014 (JP) ................................ 2014-043161
Apr. 3, 2014 (JP) ................................ 2014-077117

(51) Int. Cl.
  *B01J 23/40* (2006.01)
  *B01J 23/42* (2006.01)
  (Continued)

(52) U.S. Cl.
  CPC .............. *B01J 23/468* (2013.01); *B01J 23/10* (2013.01); *B01J 23/464* (2013.01); *B01J 35/006* (2013.01); *B01J 35/0006* (2013.01); *B01J 35/0013* (2013.01); *B01J 37/08* (2013.01); *B01J 37/16* (2013.01)

(58) Field of Classification Search
  CPC ........................................................ B01J 23/56
  USPC ......................................... 502/326, 327, 332
  See application file for complete search history.

(56) References Cited

U.S. PATENT DOCUMENTS 3,853,739 A * 12/1974 Kolb .................. C25B 11/0484
                                                                    204/290.09
4,467,045 A *  8/1984 Fung ....................... B01J 23/96
                                                                    208/140

(Continued)

FOREIGN PATENT DOCUMENTS

JP    2002-519182 A    7/2002
JP    2004-033989 A    2/2004

(Continued)

OTHER PUBLICATIONS

Iojoiu, E. et al, "Reduction of NO by Propene Over Supported Iridium Catalysts Under Lean-Burn Conditions: an in situ FTIR Study," Applied Catalysis A: General, vol. 263, (2004), pp. 39-48.
V. Kiran et al: Electro-Oxidation of Borohydride on Rhodium, Iridium, and Rhodium—Iridium Bimetallic Nanoparticles with Implications to Direct Borohydride Fuel Cells, Journal of the Electrochemical Society, vol. 157, No. 8, pp. B1201-B1208.

(Continued)

*Primary Examiner* — Cam N. Nguyen
(74) *Attorney, Agent, or Firm* — Oliff PLC

(57) ABSTRACT

An exhaust gas purification catalyst including a catalyst support and bimetallic particles supported thereon, wherein said bimetallic particles include an at least partial solid solution of rhodium and iridium and have a diffraction peak at $40.66° < 2\theta < 41.07°$ in X-ray diffraction with a CuKα ray. A method for producing an exhaust gas purification catalyst, includes heating a mixed solution containing a rhodium salt, an iridium salt and a reducing agent at a temperature sufficient to reduce rhodium and iridium, thereby producing bimetallic particles including an at least partial solid solution of rhodium and iridium; and supporting the produced bimetallic particles on a catalyst support.

19 Claims, 7 Drawing Sheets

(51) Int. Cl.
*B01J 23/56* (2006.01)
*B01J 23/46* (2006.01)
*B01J 35/00* (2006.01)
*B01J 23/10* (2006.01)
*B01J 37/08* (2006.01)
*B01J 37/16* (2006.01)

(56) References Cited

U.S. PATENT DOCUMENTS

| | | | | |
|---|---|---|---|---|
| 4,480,046 A | * | 10/1984 | Fung | B01J 23/96 208/140 |
| 5,102,851 A | * | 4/1992 | Eri | B01J 23/8913 502/302 |
| 5,116,879 A | * | 5/1992 | Eri | B01J 23/8913 518/715 |
| 2013/0248414 A1 | | 9/2013 | Semagina et al. | |
| 2014/0113810 A1 | * | 4/2014 | Shirakawa | B01D 53/9413 502/330 |
| 2014/0206530 A1 | * | 7/2014 | Shirakawa | B01D 53/9413 502/330 |
| 2015/0017570 A1 | * | 1/2015 | Yang | H01M 4/921 429/523 |

FOREIGN PATENT DOCUMENTS

| | | |
|---|---|---|
| JP | 2005-519182 A | 6/2005 |
| WO | 00/00426 A1 | 1/2000 |
| WO | 03/076543 A1 | 9/2003 |
| WO | 2014/169235 A1 | 10/2014 |

OTHER PUBLICATIONS

Uribe-Godinez J et al: "A novel Rh—Ir electrocatalyst for the oxygen reduction reaction and the hydrogen and methanol oxidation reactions," vol. 39, No. 17, pp. 9121-9127.

* cited by examiner

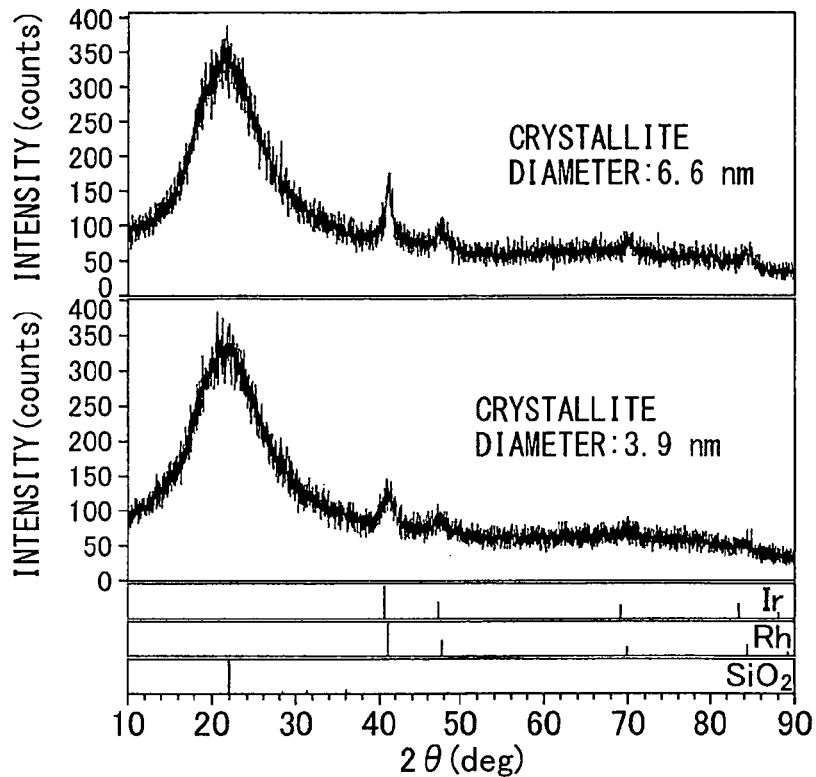
FIG. 6 (b)
FIG. 6 (a)
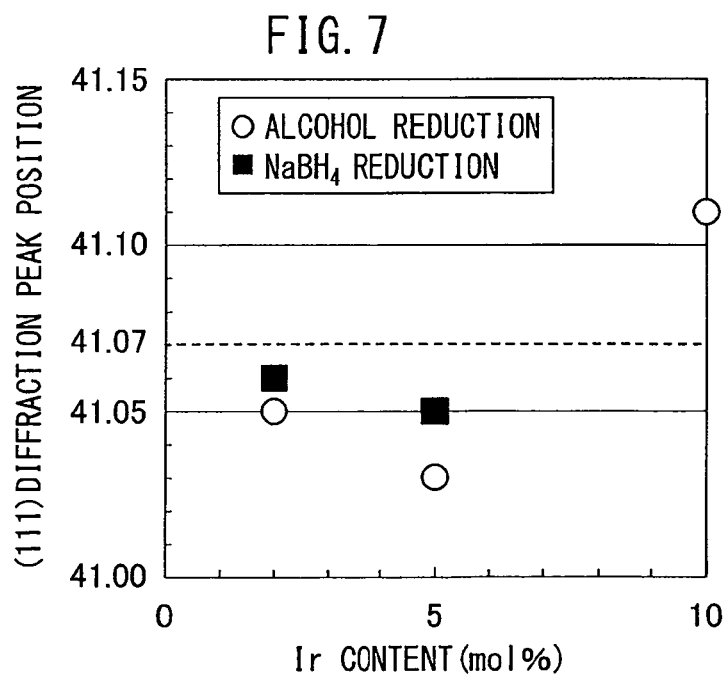

FIG. 8
(a) 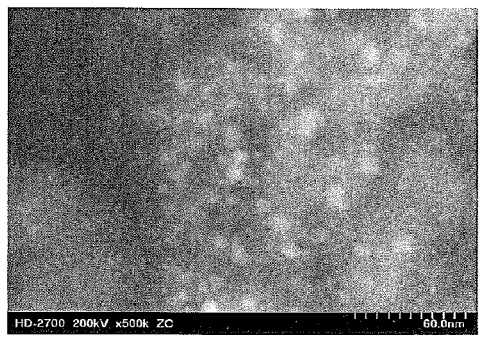 (b) 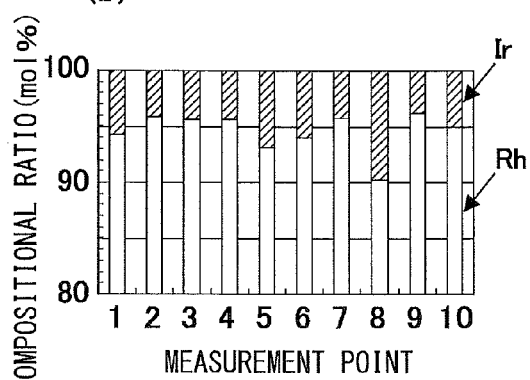
FIG. 9
(a) 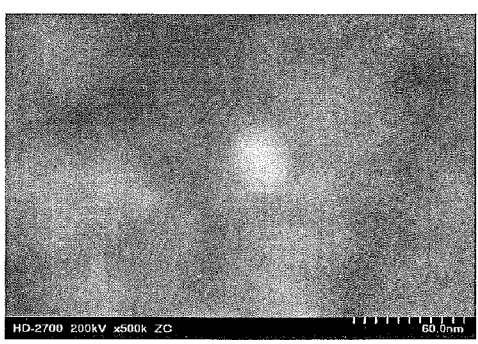 (b) 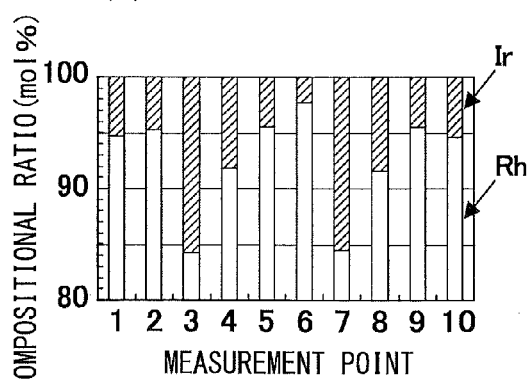

EXHAUST GAS PURIFICATION CATALYST AND PRODUCTION METHOD THEREOF

TECHNICAL FIELD

The present invention relates to an exhaust gas purification catalyst and a production method thereof. More specifically, the present invention relates to an exhaust gas purification catalyst containing rhodium as a catalyst component, and a production method thereof.

BACKGROUND ART

Conventionally, a three-way catalyst capable of simultaneously performing oxidation of carbon monoxide (CO) and hydrocarbon (HC) and reduction of nitrogen oxide (NOx) in an exhaust gas has been used as a catalyst for purifying an automotive exhaust gas. A catalyst prepared by supporting a platinum group element such as platinum (Pt), rhodium (Rh) and palladium (Pd) on a porous oxide support such as alumina ($Al_2O_3$) is widely known as a three-way catalyst. Among others, Rh has a high NOx reducing activity, and therefore is an essential component in an exhaust gas purification catalyst such as the three-way catalyst.

Patent Document 1 describes an exhaust gas treatment catalyst comprising a support and Ir and another metal supported thereon in an alloyed state. Further, Patent Document 1 describes that Rh is suitable as another metal for improving the low-temperature activity and high-temperature activity. In addition, Patent Document 1 describes that the supporting ratio of the another metal to Ir is preferably in the ratio which does not exceed 1:1 in terms of atomic ratio.

Patent Document 2 describes a process for the catalytic partial oxidation of a hydrocarbonaceous feedstock, comprising contacting a feed comprising the hydrocarbonaceous feedstock and an oxygen-containing gas with a catalyst comprising metals of Group VIII of the Periodic Table of Elements, wherein the Group VIII metals are at least rhodium and iridium in intimate association with each other.

Non-Patent Document 1 relates to Ir that is a platinum group element similarly to Rh, where an iridium catalyst such as $Ir/SiO_2$ obtained by supporting the element alone on a catalyst support is studied. Non-Patent Document 1 describes that even under oxidative reaction conditions, the surface of Ir particles is partially reduced to an $Ir^{\delta+}$ surface species allowing adsorption of CO and/or NO.

PRIOR ART DOCUMENTS

Patent Documents

Patent Document 1: JP 2004-033989A
Patent Document 2: JP 2002-519182A

Non-Patent Documents

Non-Patent Document 1: E. Iojoiu, et al., "Reduction of NO by propene over supported iridium catalysts under lean-burn conditions: an in situ FTIR study," Applied Catalysis A: General 263 (2004) 39-48

SUMMARY OF THE INVENTION

Problems to be Solved by the Invention

The exhaust gas atmosphere greatly shifts to a rich (fuel-excessive atmosphere) side or a lean (oxygen-excessive atmosphere) side relative to a stoichiometric ratio depending on the driving conditions of an automobile, etc. Rhodium is oxidized in such an oxygen-excessive lean atmosphere, and therefore may fail to exhibit a sufficient NOx purifying activity. On the other hand, when the exhaust gas atmosphere shifts from such a lean atmosphere to a stoichiometric or rich atmosphere, rhodium is reduced from its oxide to a metal and can again exhibit a high NOx purifying activity. However, even when the exhaust gas atmosphere shifts from a lean atmosphere to a stoichiometric or rich atmosphere, a time lag exists until rhodium is reduced from its oxide to a metal. Accordingly, it has been conventionally very difficult to decrease the exhaust emission under transient conditions during the course of shifting of the exhaust gas atmosphere from a lean atmosphere to a stoichiometric atmosphere.

Therefore, an object of the present invention is to provide a novel exhaust gas purification catalyst containing rhodium as a catalyst component, which has an improved NOx purifying activity during the course of shifting of the exhaust gas atmosphere, in particular during the course of shifting from a lean atmosphere to a stoichiometric or rich atmosphere; and a production method thereof.

Means for Solving the Problems

The present invention for attaining this object is as follows.

(1) An exhaust gas purification catalyst, comprising a catalyst support and bimetallic particles supported thereon, wherein the bimetallic particles comprise an at least partial solid solution of rhodium and iridium and have a diffraction peak at $40.66° < 2\theta < 41.07°$ in X-ray diffraction with a CuKα ray.

(2) The exhaust gas purification catalyst as described in item (1), wherein the bimetallic particles have an iridium content of greater than 0 mol % but less than 10 mol % based on all metal elements contained in the bimetallic particles.

(3) The exhaust gas purification catalyst as described in item (2), wherein the bimetallic particles have an iridium content of 0.5 mol % or more but 5 mol % or less based on all metal elements contained in the bimetallic particles.

(4) The exhaust gas purification catalyst as described in any one of items (1) to (3), wherein when the bimetallic particles are analyzed using a scanning transmission electron microscope equipped with an energy dispersive X-ray analyzer (STEM-EDX) under condition in which the spot size of an electron beam is 1 nm or less, the average value of iridium contents at randomly selected 10 or more measurement points is greater than 0 mol % but less than 10 mol %.

(5) The exhaust gas purification catalyst as described in any one of items (1) to (4), wherein when the bimetallic particles are analyzed using STEM-EDX under condition in which the spot size of an electron beam is 1 nm or less, both rhodium and iridium elements are detected at 70% or more of randomly selected 10 or more measurement points.

(6) The exhaust gas purification catalyst as described in any one of items (1) to (5), wherein when the bimetallic particles are analyzed using STEM-EDX under condition in which the spot size of an electron beam is 1 nm or less, a majority of randomly selected 10 or more measurement points have an iridium content within the range of ±5 mol % relative to the average value of iridium contents at all measurement points.

(7) The exhaust gas purification catalyst as described in item (6), wherein 70% or more of randomly selected 10 or more measurement points have an iridium content within the range of ±3 mol % relative to the average value of iridium contents at all measurement points.

(8) The exhaust gas purification catalyst as described in item (6) or (7), wherein the iridium content is within the range of ±2 mol % relative to the average value of iridium contents at all measurement points.

(9) The exhaust gas purification catalyst as described in any one of items (1) to (8), wherein the bimetallic particles have an average primary particle diameter of greater than 0 nm but 10 nm or less.

(10) The exhaust gas purification catalyst as described in any one of items (1) to (9), wherein the bimetallic particles have a crystallite diameter of greater than 0 nm but 7 nm or less.

(11) The exhaust gas purification catalyst as described in item (10), wherein the bimetallic particles have a crystallite diameter of greater than 0 nm but 5 nm or less.

(12) A method for producing an exhaust gas purification catalyst, comprising:
heating a mixed solution containing a rhodium salt, an iridium salt and a reducing agent at a temperature sufficient to reduce rhodium and iridium, thereby producing bimetallic particles comprising an at least partial solid solution of rhodium and iridium; and
supporting the produced bimetallic particles on a catalyst support.

(13) The method as described in item (12), wherein the bimetallic particles have a diffraction peak at $40.66°<2\theta<41.07°$ in X-ray diffraction with a CuKα ray.

(14) The method as described in item (12) or (13), wherein the reducing agent is selected from the group consisting of an alcohol, sodium borohydride, lithium hydride, ammonia borane, hydrazine, and combinations thereof.

(15) The method as described in item (14), wherein the reducing agent is alcohol.

(16) The method as described in any one of items (12) to (15), wherein the mixed solution further contains a protecting agent.

(17) The method as described in any one of items (12) to (16), wherein the mixed solution contains the rhodium salt and the iridium salt in amounts such that the bimetallic particles have an iridium content of greater than 0 mol % but less than 10 mol % based on all metal elements contained in the bimetallic particles.

(18) The method as described in item (17), wherein the mixed solution contains the rhodium salt and the iridium salt in amounts such that the bimetallic particles have an iridium content of 0.5 mol % or more but 5 mol % or less based on all metal elements contained in the bimetallic particles.

(19) The method as described in any one of items (12) to (18), wherein the heating step is performed at a temperature of 70 to 160° C.

Effect of the Invention

According to the present invention, supporting bimetallic particles comprising an at least partial solid solution of rhodium and iridium on a catalyst support makes it possible to obtain an exhaust gas purification catalyst which has a remarkably improved NOx purifying activity during the course of shifting of the exhaust gas atmosphere, especially during the course of shifting from a lean atmosphere to a stoichiometric or rich atmosphere, and in particular can exert an NOx purifying activity in a shorter time, compared with the iridium-free conventional exhaust gas purification catalyst obtained by supporting only rhodium on a catalyst support. Furthermore, according to this exhaust gas purification catalyst, it is possible to maintain the NOx purifying activity in a high state even after a given time has elapsed since shifting from a lean atmosphere to a stoichiometric or rich atmosphere, compared with an exhaust gas purification catalyst in which rhodium and iridium are supported on a catalyst support merely by the conventional co-impregnation method or sequential impregnation method. Furthermore, according to the present invention, rhodium is partially replaced by iridium, whereby the amount of rhodium that is an expensive rare metal among platinum group elements can be saved. In addition, according to the method of the present invention, in particular, use of an alcohol as a reducing agent makes it possible to produce an exhaust gas purification catalyst in which bimetallic particles consisting of a more uniform and finer solid solution of rhodium and iridium are supported on a catalyst support. Therefore, according to the method of the present invention, use of an alcohol as a reducing agent makes it possible to produce an exhaust gas purification catalyst having a further improved NOx purifying activity, compared with the case of using other reducing agents.

BRIEF DESCRIPTION OF THE DRAWINGS

FIG. 6(a) shows the X-ray diffraction pattern regarding Rh—Ir/SiO$_2$ (Ir content: 5 mol %) prepared by utilizing alcohol reduction, and FIG. 6(b) shows the X-ray diffraction pattern regarding Rh—Ir/SiO$_2$ (Ir content: 5 mol %) prepared by utilizing NaBH$_4$ reduction.

FIG. 7 shows the diffraction peak position of (111) plane as a function of the Ir content of Rh—Ir/SiO$_2$ prepared by utilizing alcohol reduction or NaBH$_4$ reduction.

FIG. 8 shows the STEM-EDX analysis of Rh—Ir/SiO$_2$ (Ir content: 5 mol %) prepared by utilizing alcohol reduction.

FIG. 9 shows the STEM-EDX analysis of Rh—Ir/SiO$_2$ (Ir content: 5 mol %) prepared by utilizing NaBH$_4$ reduction.

MODE FOR CARRYING OUT THE INVENTION

Exhaust Gas Purification Catalyst

Figure 1:
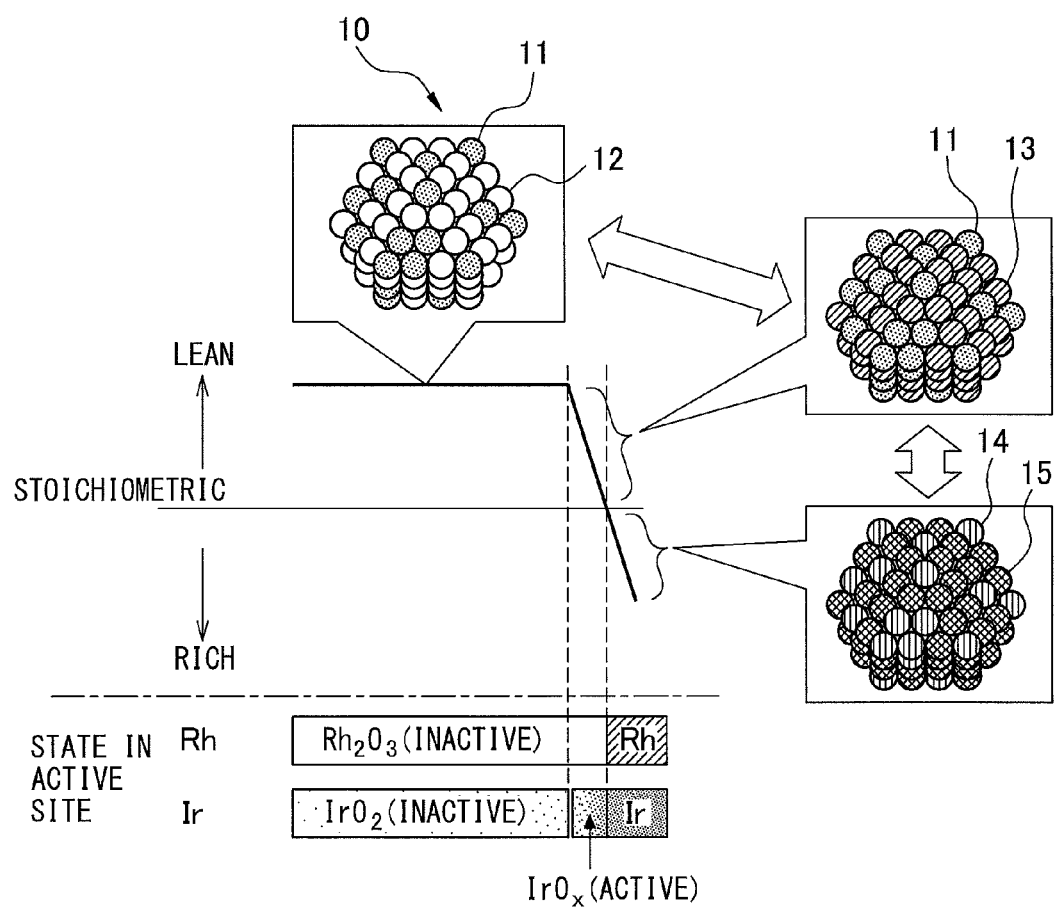
FIG. 1 is a conceptual view for explaining the mechanism for exerting the NOx purifying activity in the exhaust gas purification catalyst of the present invention.

The exhaust gas purification catalyst of the present invention comprises a catalyst support and bimetallic particles supported thereon, wherein the bimetallic particles comprise an at least partial solid solution of rhodium and iridium and have a diffraction peak at $40.66°<2\theta<41.07°$ in X-ray diffraction with a CuKα ray.

In order to simultaneously and efficiently purify three components of CO, HC and NOx by the activity of a three-way catalyst, etc., it is generally important that the ratio between air and fuel (air-fuel ratio A/F) supplied to an automotive engine is controlled to near the theoretical air-fuel ratio (stoichiometric ratio). However, as described above, the actual air-fuel ratio shifts to a rich (fuel-excessive atmosphere) side or a lean (oxygen-excessive atmosphere) side relative to the stoichiometric ratio depending on the driving conditions of an automobile, etc., and therefore the exhaust gas atmosphere also shifts to a rich side or a lean side. Rhodium, which is used as a catalyst component in a three-way catalyst, etc., is oxidized, for example, when it is exposed to such an oxygen-excessive lean atmosphere, resulting in poor metalation of rhodium, and therefore an insufficient NOx purifying activity may fail to be exhibited.

On the other hand, when the exhaust gas atmosphere shifts from such a lean atmosphere to a stoichiometric or rich atmosphere, rhodium is reduced from its oxide to a metal and can again exhibit a high NOx purifying activity. However, rhodium remains as its oxide, for example, during the course of shifting of the exhaust gas atmosphere from a lean atmosphere to a stoichiometric atmosphere, and therefore cannot achieve a sufficient NOx purifying performance. In addition, even when the exhaust gas atmosphere shifts from a lean atmosphere to a stoichiometric or rich atmosphere, a time lag exists until rhodium is reduced from its oxide to a metal. Accordingly, even after shifting to a stoichiometric or rich atmosphere, a sufficient NOx purifying performance may fail to be necessarily achieved during the course of reduction of rhodium to a metal.

The present inventors have found that supporting bimetallic particles comprising an at least partial solid solution of rhodium and iridium on a catalyst support makes it possible to obtain an exhaust gas purification catalyst which has a remarkably improved NOx purifying activity during the course of shifting of the exhaust gas atmosphere, especially during the course of shifting from a lean atmosphere to a stoichiometric or rich atmosphere, and in particular can exert an NOx purifying activity in a shorter time, compared with the iridium-free conventional exhaust gas purification catalyst obtained by supporting only rhodium on a catalyst support. In addition, the present inventors have further found that supporting bimetallic particles comprising an at least partial solid solution of rhodium and iridium on a catalyst support makes it possible to maintain the NOx purifying activity in a high state even after a given time has elapsed since shifting from a lean atmosphere to a stoichiometric or rich atmosphere, compared with an exhaust gas purification catalyst in which rhodium and iridium are supported on a catalyst support merely by the conventional co-impregnation method or sequential impregnation method.

Without being bound by any particular theory, it is believed that in the exhaust gas purification catalyst of the present invention, the NOx purifying activity is exerted, for example, by the below-described mechanism under transient conditions during the course of shifting of the exhaust gas atmosphere from lean to stoichiometric or rich.

FIG. 1 is a conceptual view for explaining the mechanism for exerting the NOx purifying activity in the exhaust gas purification catalyst of the present invention. As shown in FIG. 1, bimetallic particles 10 in the exhaust gas purification catalyst of the present invention have a structure where rhodium and iridium are at least partially solid-solutioned. In an oxygen excess lean atmosphere, rhodium and iridium are present as rhodium oxide ($Rh_2O_3$) 11 and iridium oxide ($IrO_2$) 12, respectively, and therefore cannot exert a sufficient purifying activity on NOx in an exhaust gas.

On the other hand, under transient conditions during the course of shifting of the exhaust gas atmosphere from a lean atmosphere to a stoichiometric atmosphere, as shown in FIG. 1, it is believed that rhodium remains as $Rh_2O_3$ 11, but iridium exists as a partially reduced species of $IrO_2$ 12, i.e., an intermediate species ($IrO_x$) 13 ($0<x<2$) between $IrO_2$ 12 and metallic iridium. Such an intermediate species of iridium is known to have an NO adsorption capacity (Applied Catalysis A: General 263 (2004) 39-48). Accordingly, it is believed that under the above-described transient conditions, although rhodium existing as $Rh_2O_3$ 11 in the bimetallic particles 10 cannot exhibit a sufficient NOx purifying activity, $IrO_x$ 13 similarly existing in the bimetallic particles 10 can purify NOx in an exhaust gas by reduction.

As described above, even when the exhaust gas atmosphere shifts from a lean atmosphere to a stoichiometric or rich atmosphere, a time lag exists until rhodium is reduced from its oxide to a metal. Therefore, rhodium may not be necessarily able to exhibit a sufficient NOx purifying activity during the course of reduction of rhodium to a metal. However, according to the exhaust gas purification catalyst of the present invention, it is believed that even in such a case, $IrO_x$ 13 or metallic iridium existing in the bimetallic particles can purify NOx in an exhaust gas by reduction.

In a stoichiometric or rich atmosphere, rhodium and iridium in the bimetallic particles 10 are reduced to metallic rhodium (Rh) 14 and metallic iridium (Ir) 15, respectively. At this stage, Rh 14 having a very high NOx purifying activity compared with Ir 15 mainly purifies NOx in an exhaust gas by reduction. Furthermore, in the exhaust gas purification catalyst of the present invention, the bimetallic particles 10 consisting of a solid solution of rhodium and iridium have a very uniform composition and/or a nano-level very uniform and fine particle size. As a result, according to the exhaust gas purification catalyst of the present invention, it is believed that it is possible to not only achieve an improved NOx purifying performance during the course of shifting from a lean atmosphere to a stoichiometric or rich atmosphere, but also achieve and maintain a high NOx purifying performance even after such shifting of the atmosphere, compared with an exhaust gas purification catalyst in which rhodium and iridium are supported on a catalyst support merely by a co-impregnation method, a sequential impregnation method, etc.

[Bimetallic Particles]

The bimetallic particles in the present invention comprise an at least partial solid solution of rhodium and iridium.

The expression "an at least partial solid solution of rhodium and iridium" in the present invention encompasses a state where both elements of rhodium and iridium are mutually dissolved to form an overall homogeneous solid solution (complete solid solution state), and a state where both elements of rhodium and iridium are not completely solid-solutioned, but are at least partially solid-solutioned (incomplete solid solution state). Specifically, the expression "an at least partial solid solution of rhodium and iridium" in the present invention means that the bimetallic particles consisting of rhodium and iridium have a diffraction peak between diffraction peaks corresponding to the Ir (111) plane and Rh (111) plane, respectively, in X-ray diffraction with a CuKα ray, i.e., has a diffraction peak at $40.66°<2\theta<41.07°$.

The at least partial solid solution of rhodium and iridium makes it possible to achieve a remarkably improved NOx purifying performance during the course of shifting from a lean atmosphere to a stoichiometric or rich atmosphere, especially due to the action of iridium, as described above. Furthermore, the at least partial solid solution of rhodium and iridium makes it possible to form bimetallic particles having a very uniform composition and/or a nano-level very uniform and fine particle size. Therefore, according to an exhaust gas purification catalyst comprising such bimetallic particles, it is possible to not only achieve remarkably improved NOx purifying performance during the course of shifting from a lean atmosphere to a stoichiometric or rich atmosphere, but also achieve and/or maintain high NOx purifying performance even after shifting from a lean atmosphere to a stoichiometric or rich atmosphere.

According to the present invention, the bimetallic particles preferably have an iridium content of greater than 0 mol % but less than 10 mol % based on all metal elements contained in the bimetallic particles.

When the bimetallic particles have an iridium content of 0 mol %, i.e., the bimetallic particles contain no iridium, the above-described effect due to addition of iridium, i.e., the effect such as improvement of NOx purifying performance during the course of shifting from a lean atmosphere to a stoichiometric or rich atmosphere, cannot be naturally achieved. On the other hand, when the bimetallic particles have an iridium content of 10 mol % or more, the number of iridium active sites increases, but the number of rhodium active sites decreases. In such a case, although the effect such as improvement of the NOx purifying performance during the course of shifting from a lean atmosphere to a stoichiometric or rich atmosphere may be obtained, a high NOx purifying performance may fail to be achieved and/or maintained after shifting from a lean atmosphere to a stoichiometric or rich atmosphere.

Figure 2:
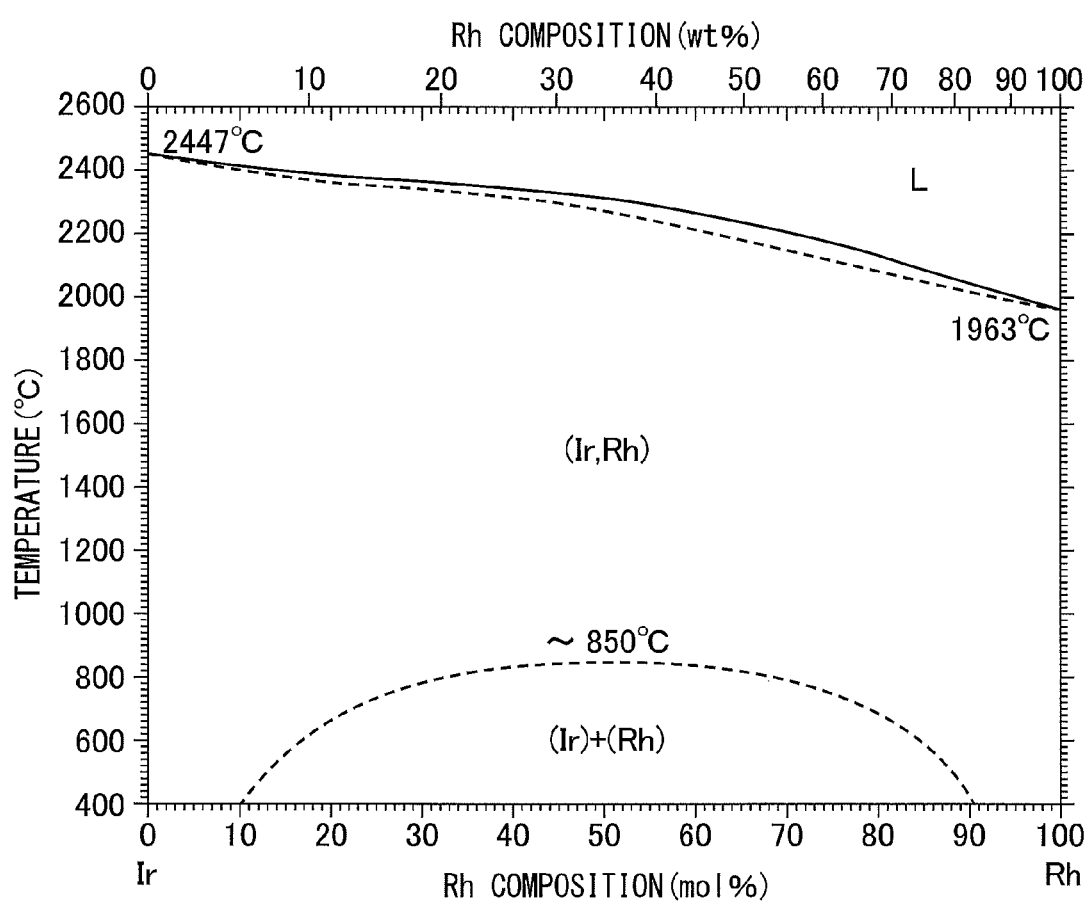
FIG. 2 is a phase diagram of rhodium and iridium.

In addition, when the bimetallic particles have an iridium content of 10 mol % or more, as is clear from the phase diagram in FIG. 2, rhodium and iridium cannot form a solid solution. As a result, the effect of the present invention due to a combination of rhodium and iridium may fail to be sufficiently obtained. For this reason, it is believed that the bimetallic particles has an optimal iridium content in view of the iridium addition-induced improvement of NOx purifying performance during the course of shifting of the exhaust gas atmosphere, the number of rhodium active sites, and formation of a solid solution of rhodium and iridium, etc.

According to the present invention, the bimetallic particles preferably have an iridium content of greater than 0 mol %, in particular 0.1 mol % or more, 0.3 mol % or more, 0.5 mol % or more, 1 mol % or more, or 2 mol % or more, and less than 10 mol %, in particular 9 mol % or less, 8 mol % or less, 7 mol % or less, 6 mol % or less, or 5 mol % or less, for example, 0.1 mol % or more but less than 9 mol %, 0.3 mol % or more but 8 mol % or less, 0.5 mol % or more but 6 mol % or less, 0.5 mol % or more but 5 mol % or less, or 2 mol % or more but 5 mol % or less, based on all metal elements contained in the bimetallic particles. By controlling the iridium content within these ranges, it is possible to maintain the number of rhodium active sites and unfailingly form a solid solution of rhodium and iridium. As a result, the effect of the present invention due to a combination of rhodium and iridium can be sufficiently brought out. In addition, according to the present invention, rhodium is partially replaced by iridium, whereby the amount of rhodium that is an expensive rare metal among platinum group elements can be saved.

Unless otherwise indicated, the term "iridium content" in the present invention refers to the ratio of the molar number of iridium element to the total molar number of metal elements contained in a rhodium salt, an iridium salt, and salts of possible additional elements which are introduced at the time of synthesis of the bimetallic particles. However, depending on the case, the "iridium content" in the present invention can also be determined by measuring the bimetallic particles or the exhaust gas purification catalyst using an optical method, for example, ICP (inductively coupled plasma) emission analysis or elemental analysis in the below-described scanning transmission electron microscope equipped with an energy dispersive X-ray analyzer (STEM-EDX).

[Analysis of Iridium Content by STEM-EDX]

According to the present invention, when the bimetallic particles are analyzed using a scanning transmission electron microscope equipped with an energy dispersive X-ray analyzer (STEM-EDX: Scanning Transmission Electron Microscope-Energy Dispersive X-ray Analysis) under condition in which the spot size of an electron beam is 1 nm or less, the average value of iridium contents at randomly selected 10 or more measurement points is preferably greater than 0 mol % but less than 10 mol %, more preferably 0.1 mol % or more but less than 9 mol %, or 0.3 mol % or more but 8 mol % or less, most preferably 0.5 mol % or more but 6 mol % or less, 0.5 mol % or more but 5 mol % or less, or 2 mol % or more but 5 mol % or less.

STEM-EDX is an analyzer fabricated by combining a scanning transmission electron microscope (STEM) and an energy dispersive X-ray analyzer (EDX), and elemental analysis in a specific portion or region of an STEM image can be performed by using this analyzer.

[Judgment of Solid Solution by STEM-EDX]

In the exhaust gas purification catalyst of the present invention, as described above, the bimetallic particles comprise an at least partial solid solution of rhodium and iridium. Such formation of a solid solution can also be judged, for example, based on the analysis of the bimetallic particles by STEM-EDX, in addition to the above-described X-ray diffraction analysis.

Specifically, in addition to the above-described X-ray diffraction analysis, the formation of a solid solution of rhodium and iridium can be determined by, for example, whether or not, when the bimetallic particles are analyzed using STEM-EDX under condition in which the spot size of an electron beam is 1 nm or less, both rhodium and iridium elements are detected at a majority of randomly selected 5 or more measurement points. In other words, when the bimetallic particles are analyzed using STEM-EDX under condition in which the spot size of an electron beam is 1 nm or less, if both rhodium and iridium elements are detected only at one or two measurement points for randomly selected 5 or more measurement points or only one element of rhodium and iridium is detected at all of the 5 measurement points, it can be judged that a solid solution of rhodium and iridium is not formed.

In particular, the formation of a solid solution of rhodium and iridium can also be determined by the fact that when the bimetallic particles are analyzed using STEM-EDX under condition in which the spot size of an electron beam is 1 nm or less, both rhodium and iridium elements are detected at 70% or more, preferably 80% or more, more preferably 90% or more, and most preferably 95% or more or 100% of randomly selected 10 or more measurement points. Using such bimetallic particles makes it possible to fully exert the effect of the present invention due to the combination of rhodium and iridium.

[Judgment of Uniformity of Solid Solution by STEM-EDX]

The bimetallic particles in the present invention have a very uniform composition as described above, where, specifically, rhodium and iridium form a nano-level uniform solid solution.

Such uniformity of the solid solution can be judged, for example, by analyzing the bimetallic particles using STEM-EDX. More specifically, the uniformity can be determined by, for example, whether or not, when the bimetallic particles are analyzed using STEM-EDX under condition in which the spot size of an electron beam is 1 nm or less, a majority of randomly selected 10 or more measurement points have an iridium content within the range of ±5 mol % relative to the average value of iridium contents at all measurement points.

Preferably, when the bimetallic particles are analyzed using STEM-EDX under condition in which the spot size of an electron beam is 1 nm or less, if 60% or more, in particular 70% or more, 80% or more, 90% or more, 95% or more, or 100% of randomly selected 10 or more measurement points have an iridium content within the range of ±5 mol %, in particular ±4 mol %, ±3 mol %, ±2 mol % or ±1.5 mol % relative to the average value of iridium contents at all measurement points, it can be judged that rhodium and iridium form a nano-level uniform solid solution. Using such bimetallic particles as a catalyst component in the exhaust gas purification catalyst makes it possible to fully exert the effect of the present invention due to the combination of rhodium and iridium. In other words, using such bimetallic particles as a catalyst component in the exhaust gas purification catalyst makes it possible to achieve a remarkably improved NOx purifying performance during the course of shifting from a lean atmosphere to a stoichiometric or rich atmosphere, and achieve and/or maintain a high NOx purifying performance even after shifting to a stoichiometric or rich atmosphere.

[Average Primary Particle Diameter of Bimetallic Particles]

According to the present invention, the bimetallic particles preferably have an average primary particle diameter of greater than 0 nm but 20 nm or less.

When the bimetallic particles have an average primary particle diameter of greater than 20 nm, rhodium and iridium may fail to form a nano-level uniform solid solution. As a result, the effect of the combination of rhodium and iridium may fail to be sufficiently obtained. In addition, in the case where the bimetallic particles have such a large average primary particle diameter, the surface area of the bimetallic particles becomes small, leading to a decrease in the number of rhodium and iridium active sites, and therefore a sufficient NOx purifying performance may fail to be achieved in the finally obtained exhaust gas purification catalyst. For this reason, in the exhaust gas purification catalyst of the present invention, the bimetallic particles preferably have an average primary particle diameter of greater than 0 nm but 20 nm or less, in particular greater than 0 nm but 15 nm or less, greater than 0 nm but 10 nm or less, greater than 0 nm but 9 nm or less, greater than 0 nm but 8 nm or less, or greater than 0 nm but 7 nm or less.

Unless otherwise indicated, the term "average primary particle diameter" in the present invention refers to an arithmetic mean value of measured values when randomly selected 100 or more particles are measured for the diameter in a fixed direction (Feret diameter) by an electron microscope such as transmission electron microscope (TEM) and scanning electron microscope (SEM).

[Crystallite Diameter of Bimetallic Particles]

According to the present invention, the bimetallic particles preferably have a crystallite diameter of greater than 0 nm but 10 nm or less.

When the bimetallic particles have a crystallite diameter of greater than 10 nm, the effect of the combination of rhodium and iridium may fail to be sufficiently obtained. In addition, in the case where the bimetallic particles have such a large crystallite diameter, the surface area of the bimetallic particles becomes small, leading to a decrease in the number of rhodium and iridium active sites, and therefore a sufficient NOx purifying performance may fail to be achieved in the finally obtained exhaust gas purification catalyst. For this reason, in the exhaust gas purification catalyst of the present invention, the bimetallic particles preferably have a crystallite diameter of greater than 0 nm but 10 nm or less, in particular greater than 0 nm but 9 nm or less, greater than 0 nm but 8 nm or less, greater than 0 nm but 7 nm or less, greater than 0 nm but 6 nm or less, greater than 0 nm but 5 nm or less, greater than 0 nm but 4.5 nm or less, or greater than 0 nm but 4 nm or less. Using bimetallic particles having such a crystallite diameter as a catalyst component makes it possible to fully exert the effect of the combination of rhodium and iridium, resulting in an exhaust gas purification catalyst having a remarkably improved NOx purifying performance.

Unless otherwise indicated, the term "crystallite diameter" in the present invention refers to a crystallite diameter calculated using the Scherrer equation from the half width at a diffraction peak obtained by powder X-ray diffraction.

[Catalyst Support]

In the exhaust gas purification catalyst of the present invention, the bimetallic particles are supported in any appropriate amount on a catalyst support. Although this is not particularly limited, for example, the bimetallic particles may be supported on the catalyst support such that the amount of rhodium and/or iridium contained in the bimetallic particles is generally 0.01 wt % or more, 0.1 wt % or more, 0.5 wt % or more, 1 wt % or more, or 2 wt % or more, and/or 10 wt % or less, 8 wt % or less, 7 wt % or less, or 5 wt % or less based on the catalyst support.

According to the present invention, a catalyst support for supporting the bimetallic particles may include, but is not particularly limited to, any metal oxide generally known as a catalyst support in the technical field of an exhaust gas purification catalyst. Such a catalyst support may include, for example, alumina ($Al_2O_3$), silica ($SiO_2$), ceria ($CeO_2$), zirconia ($ZrO_2$), titania ($TiO_2$), and combinations thereof. In view of the oxygen storage/release capacity (OSC), for example, the catalyst support preferably comprises ceria ($CeO_2$) or ceria-zirconia ($CeO_2$—$ZrO_2$) composite oxide, etc.

The catalyst support may further comprise an additional metal element. For example, the catalyst support may further comprise at least one metal element selected from the group consisting of an alkaline earth metal and a rare earth element. Using such an additional metal element makes it possible to significantly improve, for example, the heat resistance of the catalyst support. Specific examples of the additional metal element may include, but are not particularly limited to, for example, barium (Ba), lanthanum (La), yttrium (Y), praseodymium (Pr), neodymium (Nd), and combinations thereof.

The exhaust gas purification catalyst of the present invention may further comprise other catalyst metals, in addition to the above-described bimetallic particles. For example, the exhaust gas purification catalyst of the present invention may further comprise a platinum group element other than rhodium (Rh) and iridium (Ir), such as platinum (Pt) and palladium (Pd). Further using such a catalyst metal makes it possible to significantly improve not only the NOx purifying performance, but also the oxidation activity for CO or HC.

<Production Method of Exhaust Gas Purification Catalyst>

The present invention further provides a production method of an exhaust gas purification catalyst, where an exhaust gas purification catalyst comprising the above-described bimetallic particles can be produced. The production method comprises heating a mixed solution containing a rhodium salt, an iridium salt and a reducing agent at a temperature sufficient to reduce rhodium and iridium, thereby producing bimetallic particles comprising an at least partial solid solution of rhodium and iridium; and supporting the produced bimetallic particles on a catalyst support.

First of all, it is generally difficult to produce bimetallic particles comprising an at least partial solid solution of rhodium and iridium, because rhodium and iridium cannot generally form a solid solution when the iridium content is about 10 mol % or more but about 90 mol % or less, as is clear from the phase diagram in FIG. 2.

As a method for producing an exhaust gas purification catalyst comprising a catalyst support and a plurality of metal elements supported thereon, for example, a so-called impregnation method, in which respective metal elements are supported by simply impregnating a catalyst support with a mixed solution containing the salts of these metal elements, followed by drying, firing, etc., is generally known. However, bimetallic particles having a particular combination of rhodium and iridium, in which these metal elements form a uniform solid solution, cannot be formed by the conventional impregnation method. In addition, it is believed that rhodium and iridium are present separately as rhodium particles and iridium particles, respectively, on the catalyst support in the exhaust gas purification catalyst obtained by such a method. Therefore, a sufficient NOx purifying performance cannot be achieved in an exhaust gas purification catalyst in which rhodium and iridium are supported on a catalyst support by the conventional impregnation method.

As another method for producing an exhaust gas purification catalyst comprising a catalyst support and a plurality of metal elements supported thereon, a so-called coprecipitation method comprising adding a basic substance such as aqueous ammonia to a mixed solution having salts of respective metal elements dissolved therein, thereby causing coprecipitation, and heat-treating the obtained precipitate is generally known. However, similarly to the impregnation method, bimetallic particles comprising a uniform solid solution of rhodium and iridium cannot be formed by such a coprecipitation method.

The present inventors have found that unlike the conventional method using an impregnation method or a coprecipitation method, bimetallic particles comprising an at least partial solid solution of rhodium and iridium, in particular a uniform solid solution of rhodium and iridium can be produced by heating a mixed solution containing a rhodium salt and an iridium salt in particular amounts, especially in amounts such that the bimetallic particles have an iridium content of greater than 0 mol % but less than 10 mol % and containing a reducing agent, at a temperature sufficient to reduce rhodium and iridium. Furthermore, the present inventors have found that introducing a catalyst support into a solution containing the produced bimetallic particles consisting of a solid solution of rhodium and iridium, and supporting the bimetallic particles on the catalyst support using a conventionally known method makes it possible to obtain an exhaust gas purification catalyst which has a remarkably improved NOx purifying performance during the course of shifting from a lean atmosphere to a stoichiometric or rich atmosphere, and exhibits a high NOx purifying performance even after shifting to a stoichiometric or rich atmosphere.

Figure 3:
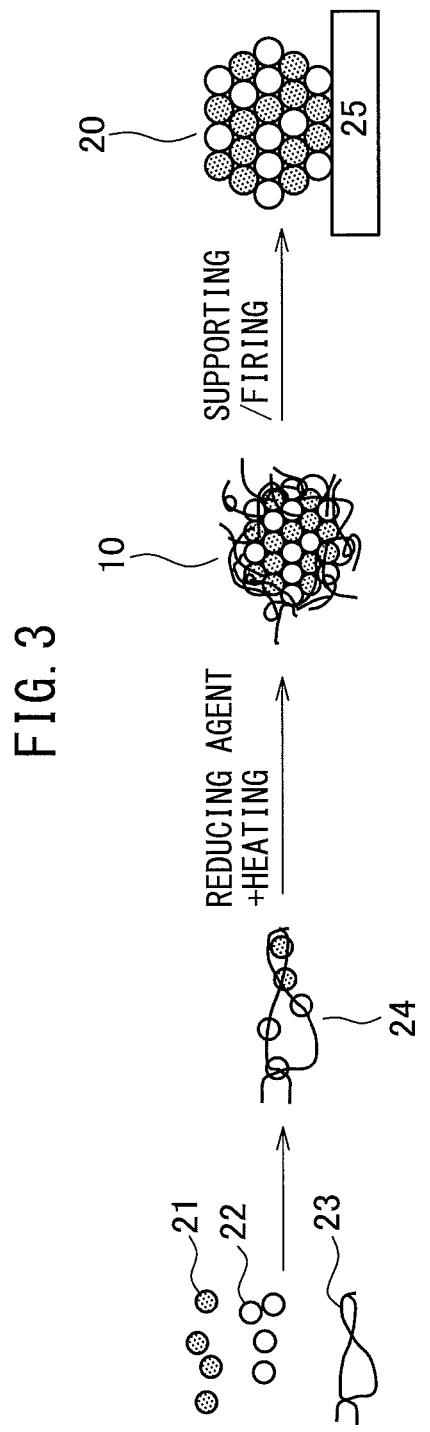
FIG. 3 is a diagram schematically showing a method for producing the exhaust gas purification catalyst of the present invention.

FIG. 3 is a diagram schematically showing a method for producing the exhaust gas purification catalyst of the present invention. Referring to FIG. 3, for example, first, a rhodium salt and an iridium salt are dissolved in one or more solvents to prepare a mixed solution containing $Rh^{3+}$ ions 21, $Ir^{4+}$ ions 22, and the later-described optional protecting agent 23 such as polyvinylpyrrolidone (PVP). At this time, a complex 24 is formed by $Rh^{3+}$ ions 21, $Ir^{4+}$ ions 22, and optional protecting agent 23.

Then, a reducing agent, particularly a reducing agent such as alcohol is added, and the solution is heated at a temperature sufficient to reduce rhodium and iridium, whereby both $Rh^{3+}$ ions 21 and $Ir^{4+}$ ions 22 dissolved in the mixed solution can be simultaneously reduced. As a result, Rh—Ir bimetallic particles 10 comprising a solid solution of rhodium and iridium can be obtained. Next, a catalyst support 25 consisting of a metal oxide, etc., is introduced into a solution containing the Rh—Ir bimetallic particles 10 synthesized as described above, and then subjecting the catalyst support to drying, firing, etc., makes it possible to obtain exhaust gas purification catalyst 20 comprising the catalyst support 25 and the Rh—Ir bimetallic particles 10 supported thereon.

[Rhodium Salt and Iridium Salt]

According to the method of the present invention, a rhodium salt and iridium salt may include, but are not particularly limited to, for example, chlorides, nitrates, acetates, and sulfates of these metal elements. In the method of the present invention, predetermined amounts of rhodium salt and iridium salt are dissolved in one or more solvents to prepare a solution containing rhodium ions and iridium ions.

[Solvent]

A solvent used in a mixed solution containing the rhodium salt and iridium salt may include any solvent capable of dissolving these metal salts, for example, an aqueous solvent such as water, and an organic solvent such as alcohol. For example, in the case where an alcohol, etc., is used as the solvent in the method of the present invention, the alcohol can act not only as a solvent for the rhodium salt and iridium salt, but also as a reducing agent.

In the method of the preset invention, the rhodium salt and iridium salt may be appropriately added to the solvent in amounts corresponding to the desired iridium content in the bimetallic particles. The rhodium salt and iridium salt may be added to the above solvent in amounts such that the bimetallic particles have an iridium content of, but not particularly limited to, generally greater than 0 mol % but less than 10 mol %, 0.1 mol % or more but less than 9 mol %, 0.3 mol % or more but 8 mol % or less, 0.5 mol % or more but 6 mol % or less, 0.5 mol % or more but 5 mol % or less, or 2 mol % or more but 5 mol % or less based on all metal elements contained in the bimetallic particles.

[Reducing Agent]

According to the method of the present invention, a reducing agent added to a mixed solution containing the rhodium salt and iridium salt may include, but is not particularly limited to, for example, an alcohol such as ethanol and propanol, sodium borohydride ($NaBH_4$), lithium hydride (LiH), ammonia borane ($NH_3BH_3$), hydrazine ($N_2H_4$), and combinations thereof. The reducing agent is preferably an alcohol. Use of an alcohol such as ethanol and propanol as the reducing agent makes it possible to form bimetallic particles consisting of a solid solution of rhodium and iridium and having a more uniform composition and/or a more uniform and finer particle size, compared with the case of using a relatively strong reducing agent such as sodium borohydride ($NaBH_4$). The reducing agent may be added in an amount sufficient to reduce the rhodium ions and iridium ions dissolved in the mixed solution to form bimetallic particles comprising an at least partial solid solution of rhodium and iridium.

Without being bound by any particular theory, it is believed that bimetallic particles consisting of a solid solution of rhodium and iridium and having a more uniform composition and/or particle size is formed when an alcohol is used as the reducing agent, for the following reasons.

First, in order to form uniform Rh—Ir bimetallic particles, it is necessary to provide an environment enabling different ions, i.e., rhodium ions and iridium ions, to simultaneously repeat reduction/precipitation, redissolution and reprecipitation. As is clear from the fact that both rhodium and iridium are a platinum group element, there is no large difference between the reduction potential from rhodium ions to metallic rhodium and the reduction potential from iridium ions to metallic iridium. Therefore, simultaneous precipitation of them is relatively easy. However, it is believed that using a reducing agent such as sodium borohydride generally having a stronger reducing power than that of an alcohol with a combination of these metal elements under heating conditions results in more accelerated precipitation of rhodium and iridium. In this case, it is believed that rhodium and iridium do not form a solid solution, and therefore precipitate separately as rhodium particles and iridium particles, respectively.

On the other hand, in a method of synthesizing metal particles using such a reducing agent, precipitation and dissolution of a metal are reversible. Accordingly, in order to synthesize a uniform solid solution from a combination of metal elements that are likely to undergo precipitation, such as rhodium and iridium, it is believed that it is very important to promote the repetition of redissolution and reprecipitation of these metals. In order to promote the repetition of the redissolution and reprecipitation, it is believed that it is very effective to reduce the reaction rate by using a reducing agent having a relatively weak reducing power. An alcohol such as ethanol and propanol generally acts as a reducing agent having a weak reducing power, compared with a reducing agent such as sodium borohydride, lithium hydride, ammonia borane and hydrazine. For these reasons, it is believed that in the method of the present invention, bimetallic particles consisting of a solid solution of rhodium and iridium and having a more uniform composition and/or particle size can be formed by using an alcohol as the reducing agent, compared with the case of using other reducing agents.

[Protecting Agent]

In the method of the present invention, a protecting agent may be optionally added to the mixed solution containing a rhodium salt and iridium salt, in order to coordinate or adsorb the protecting agent to the surface of the bimetallic particles produced in the heating step of the method to suppress aggregation and particle growth of the bimetallic particles and stabilize them. The protecting agent may include, but is not particularly limited to, preferably a coordinating substance and a substance having an ability of coordinating to both rhodium element and iridium element. The protecting agent that can be used in the method of the present invention includes, for example, a polymer compound such as hydrophilic polymer, and an amphipathic molecule.

The hydrophilic polymer includes a hydroxyl group-containing compound such as polyvinyl alcohol (PVA), a cyclic amide-containing compound such as polyvinylpyrrolidone (hereinafter, simply referred to as PVP), a cyclic imide-containing compound, a carboxyl group-containing compound such as polyacrylic acid (PAA), poly(sodium acrylate), poly(potassium acrylate), crosslinked polyacrylic acid partial hydrate and copolymer of acrylic acid and itaconic acid amides, a carboxylic acid ester compound such as saponified vinyl acetate-acrylic acid ester copolymer, an amide group-containing compound such as polyacrylamide, polyacrylamide partial hydrolysate and polyacrylamide partial hydrolysate, a nitrile group-containing compound such as acrylonitrile copolymer, a water-soluble or hydrophilic polymer such as polyvinylpyridine, polyethyleneimine (PEI), polyallylamine, polyamine, N-(3-aminopropyl)diethanolamine, polyamino acid, polyphosphoric acid and heteropolyacid, and copolymers thereof, a natural product such as cyclodextrin, aminopectin, methyl cellulose and gelatin, and the like. Among them, PVP is preferably used.

The amphipathic molecule may have a hydrophilic group and a lipophilic group, and includes an anionic surfactant, e.g., a higher fatty acid alkali salt such as sodium stearate, an alkyl sulfate such as sodium dodecylsulfate, an alkylsulfonate such as sodium dodecylsulfonate, and an alkylarylsulfonate such as sodium ethylbenzenesulfonate; a cationic surfactant, e.g., dodecyltrimethylammonium bromide, a higher amine halate of dodecyltrimethylammonium bromide, an alkylpyridinium halide such as methylpyridinium iodide, and a tetraammonium salt such as tetraalkylammonium iodide; a nonionic surfactant, e.g., a polyethylene glycol fatty acid ester such as polyethylene glycol alkyl ether and polyethylene glycol monolaurate, and a sorbitan fatty acid ester; and an amphoteric surfactant such as amino acid. In the method of the present invention, adding the protecting agent to the mixed solution containing a rhodium salt, an iridium salt, a solvent and a reducing agent can make certain that the size of the obtained bimetallic particles is controlled to a nanometer size.

In the method of the present invention, the order of mixing a rhodium salt, an iridium salt, a reducing agent and an optional protecting agent is not particularly limited, and they may be mixed in an arbitrary order. For example, after adding an optional protecting agent to a solution containing a rhodium salt and an iridium salt, a reducing agent may be added thereto, or after adding a reducing agent to an optional protecting agent, a solution containing a rhodium salt and an iridium salt may be added to the resulting mixed solution.

[Heating Step]

According to the method of the present invention, in a heating step, a mixed solution containing a rhodium salt, an iridium salt, a solvent, a reducing agent and an optional protecting agent is heated at a temperature sufficient to reduce rhodium and iridium, especially a temperature of 70° C. or more but 200° C. or less, preferably 70° C. or more but 160° C. or less, more preferably 80° C. or more but 150° C. or less. This heating step may be performed over an appropriate time period depending on the kind of the reducing agent used or the heating temperature, and the heating step is not particularly limited, but may be generally performed at the above temperature for 15 minutes to 5 hours, especially 30 minutes to 3 hours.

[Supporting Step]

According to the method of the present invention, the bimetallic particles consisting of a solid solution of rhodium and iridium produced in the heating step are supported on a catalyst support in the subsequent supporting step. The catalyst support introduced in the supporting step may include, but is not particularly limited to, any metal oxide generally used as a catalyst support in the technical field of an exhaust gas purification catalyst. The catalyst support includes, for example, alumina ($Al_2O_3$), silica ($SiO_2$), ceria ($CeO_2$), zirconia ($ZrO_2$), titania ($TiO_2$), and combinations thereof, etc., as described above.

In the supporting step, a solution containing the bimetallic particles consisting of a solid solution of rhodium and iridium synthesized in the heating step is added to, for example, a powder of a metal oxide (catalyst support) dispersed in a predetermined amount of a solution so that the amount of rhodium and/or iridium (supported amount in terms of metal) generally ranges from 0.01 to 10 wt % based on the catalyst support. Then, the obtained solution may be dried and fired at a predetermined temperature for a predetermined time period, especially at a temperature and for a time period sufficient to decompose and remove the salt portion of the metal salt, the optional protecting agent, etc., as well as the reducing agent and to support the bimetallic particles on the catalyst support, thereby obtaining an exhaust gas purification catalyst comprising the catalyst support and Rh—Ir bimetallic particles supported thereon. In general, the drying may be performed under reduced pressure or ordinary pressure at a temperature of about 80° C. to about 250° C. for about 1 hour to about 24 hours, and the firing may be performed in an oxidizing atmosphere, for example, air, at a temperature of about 300° C. to about 800° C. for about 30 minutes to about 10 hours.

Finally, if desired, the exhaust gas purification catalyst of the present invention obtained as described above may be used, for example, by pressing the exhaust gas purification catalyst under high pressure to shape it into a pellet form, or by adding a predetermined binder, etc., to the exhaust gas purification catalyst to form a slurry and coating a catalyst substrate such as a cordierite-made honeycomb substrate with the slurry.

The present invention is described in more detail below based on Examples, but the present invention is not limited thereto.

EXAMPLES

In the following Examples, exhaust gas purification catalysts comprising Rh—Ir bimetallic particles as a catalyst component were prepared, and the properties and NOx purifying performance thereof were investigated.

Example A

Synthesis of Rh—Ir Bimetallic Particles (Ir Content: 5 Mol %) by Alcohol Reduction First, a rhodium chloride solution ($RhCl_3$: 0.494 mmol) and a chloroiridic acid solution ($H_2IrCl_6$: 0.026 mmol) were added to 15 mL of distilled water (Solution 1). Next, 5.11 mmol (0.57 g: corresponding to 10 times equivalent based on the metal amount) of polyvinylpyrrolidone (PVP-K25) as a protecting agent was put in a 500-mL flask and then dissolved by adding 210 mL of 1-propanol (Solution 2). Solution 2 was refluxed under heating while deaerating the solution with nitrogen so as to expel oxygen in the solution and create a condition under which rhodium and iridium can be easily reduced, and Solution 1 was introduced thereinto while washing the solution with 50 mL of 1-propanol. Then, refluxing with stirring was continued under heating for 2 hours. During refluxing, the color of the liquid was changed to black. After 2 hours, the refluxing under heating was stopped, and the solution was cooled to room temperature while keeping stirring. The obtained liquid was concentrated on a rotary evaporator until the volume reached about 50 mL to obtain a dispersion liquid containing black Rh—Ir bimetallic particles (Ir content: 5 mol %). Precipitation was not generated.

[Preparation of Rh—Ir Supported Catalyst (Ir Content: 5 Mol %)]

$Nd_2O_3$—$Al_2O_3$—$ZrO_2$—$La_2O_3$—$CeO_2$ obtained by adding neodymium (Nd) and lanthanum (La) to alumina ($Al_2O_3$) and a ceria-zirconia composite oxide ($CeO_2$—$ZrO_2$) having an oxygen storage/release capacity was used as a catalyst support. First, a predetermined amount of the catalyst support was added to 1-propanol, and the dispersion liquid containing black Rh—Ir bimetallic particles (Ir content: 5 mol %) obtained above was introduced thereinto. Then, the dispersion medium was removed under heating, and the residue was dried for one night in a furnace at 120° C. and cracked in a mortar. Finally, the obtained powder was fired at 500° C. for 3 hours in air to remove residual matters such as polyvinylpyrrolidone, thereby obtaining an exhaust gas purification catalyst consisting of Rh—Ir supported catalyst (Ir content: 5 mol %, supported amount of Rh: 0.2 wt %, supported amount of Ir: 0.02 wt %).

Example B

Preparation of Rh—Ir Supported Catalyst (Ir Content: 0.5 Mol %)

An exhaust gas purification catalyst consisting of an Rh—Ir supported catalyst (Ir content: 0.5 mol %) was obtained in the same manner as in Example A, except that while the total molar number of rhodium and iridium was the same, the rhodium chloride solution and chloroiridic acid solution were added in amounts giving an Ir content of 0.5 mol %.

Example C

Preparation of Rh—Ir Supported Catalyst (Ir Content: 2 Mol %)

An exhaust gas purification catalyst consisting of an Rh—Ir supported catalyst (Ir content: 2 mol %) was obtained in the same manner as in Example A, except that while the total molar number of rhodium and iridium was the same, the rhodium chloride solution and chloroiridic acid solution were added in amounts giving an Ir content of 2 mol %.

Example D

Preparation of Rh—Ir Supported Catalyst (Ir Content: 10 Mol %)

An exhaust gas purification catalyst consisting of an Rh—Ir supported catalyst (Ir content: 10 mol %) was obtained in the same manner as in Example A, except that while the total molar number of rhodium and iridium was the same, the rhodium chloride solution and chloroiridic acid solution were added in amounts giving an Ir content of 10 mol %.

Example E

Preparation of Rh—Ir Supported Catalyst (Ir Content: 90 Mol %)

An exhaust gas purification catalyst consisting of an Rh—Ir supported catalyst (Ir content: 90 mol %) was obtained in the same manner as in Example A, except that while the total molar number of rhodium and iridium was the same, the rhodium chloride solution and chloroiridic acid solution were added in amounts giving an Ir content of 90 mol %.

Example F

Preparation of Rh Supported Catalyst (Ir Content: 0 Mol %)

An iridium-free exhaust gas purification catalyst consisting of an Rh supported catalyst (Ir content: 0 mol %) was obtained in the same manner as in Example A, except that the rhodium chloride solution ($RhCl_3$: 0.520 mmol) was added to 15 mL of distilled water and the chloroiridic acid solution was not added.

[Activity Evaluation of Catalyst]

Figure 4:
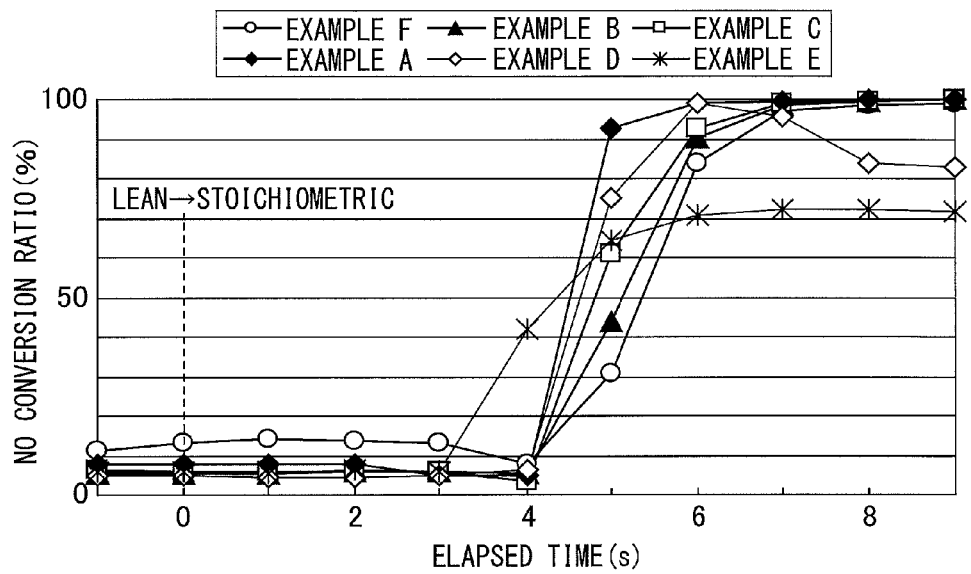
FIG. 4 shows the NO conversion ratio (%) regarding the exhaust gas purification catalysts of Examples A to F under the transient conditions during the course of shifting from a lean atmosphere to a stoichiometric atmosphere.

The exhaust gas purification catalysts of Examples A to F were evaluated for the NOx purifying activity. Each exhaust gas purification catalyst was compression-molded into a pellet under a pressure of 2 t and used as the evaluation sample. First, 2 g of the pellet-shaped exhaust gas purification catalyst was put in a flow-type catalyst evaluation apparatus. Next, a lean model gas shown in following Table 1 was flowed to the catalyst bed at a temperature of 400° C. and a flow rate of 10 L/min (space velocity SV: about 200,000 $h^{-1}$) and then switched to a stoichiometric model gas (flow rate: 10 L/min), and the transient change of the NO conversion ratio accompanying such atmosphere shifting was examined. The analysis was performed by measuring the gas composition after passing through the catalyst using an infrared spectrometer. FIG. 4 shows the results thereof.

TABLE 1

| | Composition of Model Gas for Evaluation | | | | | | |
|---|---|---|---|---|---|---|---|
| Gas Composition | CO (%) | $C_3H_6$ (ppm) | NO (ppm) | $O_2$ (%) | $H_2O$ (%) | $CO_2$ (%) | $N_2$ |
| Lean model gas | 0.65 | 3000[a] | 1500 | 10 | 3 | 10 | balance |
| Stoichiometric model gas | 0.65 | 3000[a] | 1500 | 0.7 | 3 | 10 | balance |

[a] Shows the concentration of carbon contained in $C_3H_6$.

FIG. 4 shows the NO conversion ratio (%) regarding the exhaust gas purification catalysts of Examples A to F under the transient conditions during the course of shifting from a lean atmosphere to a stoichiometric atmosphere. FIG. 4 shows the elapsed time (s) after switching of the model gas for evaluation from a lean model gas to a stoichiometric model gas on the abscissa, and shows the NO conversion ratio (%) on the ordinate. Incidentally, this catalyst evaluation apparatus requires about 3 to 4 seconds to switch the model gas for evaluation actually flowing to the catalyst bed after switching of the model gas for evaluation is commanded.

Referring to FIG. 4, in the exhaust gas purification catalyst of Example F in which iridium is not contained and only rhodium is supported on the catalyst support, the NO conversion ratio reached almost 100% when a given time was passed after shifting from a lean atmosphere to a stoichiometric atmosphere. However, as is clear from the data on the NO conversion ratio at about 4 to 7 seconds, the rise in the NO conversion ratio was relatively slow under the transient conditions during the course of shifting from a lean atmosphere to a stoichiometric atmosphere.

In contrast therewith, in the exhaust gas purification catalysts of Examples A to C containing a relatively small amount of iridium, the NO conversion ratio was greatly enhanced in a shorter time under the transient conditions, and therefore very high transient characteristics were exhibited. Furthermore, as is clear from the data on the NO conversion ratio at about 7 seconds or more, it is understood that in the exhaust gas purification catalysts of Examples A to C, a high NOx purifying performance was maintained even after shifting from a lean atmosphere to a stoichiometric atmosphere. On the other hand, in the exhaust gas purification catalyst of Example D having an Ir content of 10 mol %, very high transient characteristics were exhibited, similarly to Examples A to C, but there was observed a tendency that the NO conversion ratio decreases with an elapsed time of about 7 seconds or more. In the exhaust gas purification catalyst (Ir content: 90 mol %) of Example E having a higher Ir content, unlike the other exhaust gas purification catalysts, the NOx purifying activity was exhibited with a shortest elapsed time of about 3 seconds, but the NOx purifying activity was saturated at an NO conversion ratio of about 70%.

The results of FIG. 4 suggest that under the transient conditions during the course of shifting from a lean atmosphere to a stoichiometric atmosphere, NO is reduced and purified mainly by the action of iridium, and after shifting from a lean atmosphere to a stoichiometric atmosphere, NO is reduced and purified mainly by the action of rhodium.

Next, with respect to the exhaust gas purification catalyst of Example A having an Ir content of 5 mol % where the best transient characteristics were obtained, other catalyst preparation methods were studied.

Example G

Preparation of Rh—Ir Supported Catalyst (Ir Content: 5 Mol %) by $NaBH_4$ Reduction In this Example, Rh—Ir bimetallic particles were synthesized by using not an alcohol, but sodium borohydride ($NaBH_4$) as the reducing agent, and an exhaust gas purification catalyst was prepared using the synthesized Rh—Ir bimetallic particles.

Specifically, first, a rhodium chloride solution ($RhCl_3$: 0.494 mmol) and a chloroiridic acid solution ($H_2IrCl_6$: 0.026 mmol) were added to 15 mL of distilled water (Solution 1). Next, 5.11 mmol (0.57 g: corresponding to 10 times equivalent based on the metal amount) of polyvinylpyrrolidone (PVP-K25) as a protecting agent was put in a 500-mL flask and then dissolved by adding 210 mL of 1-propanol (Solution 2). Next, Solution 1 was added to Solution 2 and stirred. Then, after adding 10 mL of distilled water to the resulting mixed solution, 0.34 mmol (corresponding to 0.33 times equivalent based on the metal amount) of sodium borohydride ($NaBH_4$) was rapidly introduced thereinto. After the introduction, the color of the liquid was changed to black. Then, the mixed solution was refluxed under heating while deaerating the mixed solution with nitrogen, and refluxing under heating was continued for 2 hours. After 2 hours, the refluxing under heating was stopped, and the solution was cooled to room temperature while keeping stirring to obtain a dispersion liquid containing black Rh—Ir bimetallic particles (Ir content: 5 mol %). Precipitation was not generated. Then, an exhaust gas purification catalyst consisting of an Rh—Ir supported catalyst (Ir content: 5 mol %) was obtained in the same manner as in Example A using the dispersion liquid.

Example H

Preparation of Rh—Ir Supported Catalyst (Ir Content: 5 Mol %) by Sequential Impregnation Method An exhaust gas purification catalyst consisting of an Rh—Ir supported catalyst (Ir content: 5 mol %) was obtained in the same manner as in Example A, except that Rh metal particles and Ir metal particles were separately synthesized by alcohol reduction, and these metal particles were supported on the catalyst support by sequentially impregnation.

[Activity Evaluation of Catalyst]

Figure 5:
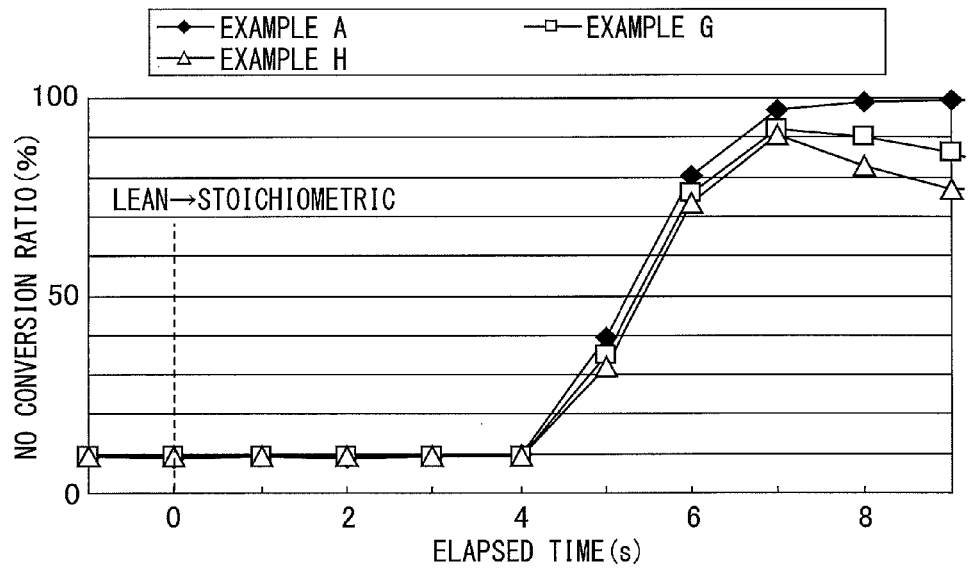
FIG. 5 shows the NO conversion ratio (%) regarding the exhaust gas purification catalysts of Examples A, G and H under the transient conditions during the course of shifting from a lean atmosphere to a stoichiometric atmosphere.

The exhaust gas purification catalysts of Examples A, G and H were evaluated for the NOx purifying activity in the same manner as described regarding FIG. 4, except that the temperature of the catalyst bed was set to 300° C. FIG. 5 shows the results thereof. FIG. 5 shows the NO conversion ratio (%) regarding the exhaust gas purification catalysts of Examples A, G and H under the transient conditions during the course of shifting from a lean atmosphere to a stoichiometric atmosphere.

Referring to FIG. 5, it can be seen that the exhaust gas purification catalyst of Example A, where the Rh—Ir bimetallic particles were synthesized by alcohol reduction, exhibits the highest transient characteristics, and maintains the NOx purifying activity in a high state even after a given time has elapsed since shifting from a lean atmosphere to a stoichiometric atmosphere. In the exhaust gas purification catalyst of Example G where the Rh—Ir bimetallic particles were synthesized by NaBH$_4$ reduction, there was observed a tendency that the NO conversion ratio slightly decreases with an elapsed time of about 7 seconds or more, but high transient characteristics were exhibited, similarly to Example A. On the other hand, in the exhaust gas purification catalyst of Example H where the catalyst support was sequentially impregnated with Rh metal particles and Ir metal particles, transient characteristics lower than in Examples A and G were exhibited and the NO conversion ratio was significantly decreased with an elapsed time of 7 seconds or more.

[Analysis of Catalyst by X-Ray Diffraction (XRD)]

Next, the exhaust gas purification catalysts prepared utilizing alcohol reduction or NaBH$_4$ reduction were analyzed by X-ray diffraction (XRD) (X-ray source: CuKα). FIG. 6 shows the results thereof. These exhaust gas purification catalysts were prepared in the same manner as in Examples A and G, except that silica (SiO$_2$) was used as the catalyst support and the supported amount of the Rh—Ir bimetallic particles was changed to 2 wt %. Before the analysis, each catalyst was subjected to a reduction pretreatment at a temperature of 400° C. in a reducing gas atmosphere consisting of 1% H$_2$/N$_2$ balance.

FIG. 6(a) shows the X-ray diffraction pattern regarding Rh—Ir/SiO$_2$ (Ir content: 5 mol %) prepared by utilizing alcohol reduction, and FIG. 6(b) shows the X-ray diffraction pattern regarding Rh—Ir/SiO$_2$ (Ir content: 5 mol %) prepared by utilizing NaBH$_4$ reduction. FIGS. 6(a) and (b) also show the crystallite diameter of the Rh—Ir bimetallic particles regarding each catalyst. These values were calculated by the Scherrer equation from the diffraction peak around 2θ=41° regarding respective catalysts.

Referring to FIG. 6(a), a diffraction peak corresponding to a face-centered cubic lattice structure (fcc structure) of rhodium was confirmed around 2θ=41°. More specifically, this diffraction peak was detected at 2θ=41.03°, and therefore was shifted to the low angle side from 2θ=41.07° corresponding to Rh (111) plane. In FIG. 6(b), similarly, a diffraction peak was detected at 2θ=41.05°, and therefore the same peak shift was observed. These diffraction peaks are located between 2θ=40.66° corresponding to Ir (111) plane and 2θ=41.07° corresponding to Rh (111) plane, and therefore indicate the formation of a solid solution of rhodium and iridium. In addition, it was found that the Rh—Ir bimetallic particles synthesized by alcohol reduction have a very small crystallite diameter, compared with the Rh—Ir bimetallic particles synthesized by NaBH$_4$ reduction, and therefore exist as finer particles.

Next, the exhaust gas purification catalysts prepared by utilizing alcohol reduction or NaBH$_4$ reduction were examined for the diffraction peak position of (111) plane when the Ir content was changed. FIG. 7 shows the results thereof. Incidentally, these catalysts were prepared in the same manner as in the case of FIG. 6 and subjected to a reduction pretreatment. FIG. 7 shows the diffraction peak position of (111) plane as a function of the Ir content of Rh—Ir/SiO$_2$ prepared by utilizing alcohol reduction or NaBH$_4$ reduction.

Referring to FIG. 7, with Ir contents of 2 mol % and 5 mol %, a peak shift from 2θ=41.07° to the low angle side was observed in both Rh—Ir/SiO$_2$ prepared by utilizing alcohol reduction and NaBH$_4$ reduction. The shift amount at each Ir content was larger in Rh—Ir/SiO$_2$ prepared by utilizing alcohol reduction. This suggests that formation of a solid solution of rhodium and iridium proceeded in the Rh—Ir bimetallic particles obtained by alcohol reduction, compared with the Rh—Ir bimetallic particles obtained by NaBH$_4$ reduction. On the other hand, in the case of Rh—Ir/SiO$_2$ with an Ir content of 10 mol % prepared by utilizing alcohol reduction, a peak shift from 2θ=41.07° to the high angle side was observed, and therefore the formation of a solid solution of rhodium and iridium was not confirmed.

[Analysis of Catalyst by STEM-EDX]

[Rh—Ir Supported Catalysts (Ir Content: 5 Mol %) Utilizing Alcohol Reduction or NaBH$_4$ Reduction]

Next, the exhaust gas purification catalysts Rh—Ir/SiO$_2$ (Ir content: 5 mol %) prepared by utilizing alcohol reduction or NaBH$_4$ reduction were measured by a scanning transmission electron microscope equipped with an energy dispersive X-ray analyzer (STEM-EDX) (JEM1000, manufactured by JEOL, accelerating voltage: 200 kV). The results are shown in FIGS. 8 and 9 and following Tables 2 and 3. These exhaust gas purification catalysts were prepared in the same manner as in Examples A and G, except that silica (SiO$_2$) was used as the catalyst support and the supported amount of the Rh—Ir bimetallic particles was changed to 2 wt %.

TABLE 2

| STEM-EDX Analysis of Catalyst (Ir content: 5 mol %) Prepared by Alcohol Reduction | | | |
|---|---|---|---|
| Measurement Points | Primary Particle Diameter (nm) | Composition Rh (mol %) | Ir (mol %) |
| 1 | 7.3 | 94.2 | 5.8 |
| 2 | 5.9 | 95.9 | 4.1 |
| 3 | 6.1 | 95.6 | 4.4 |
| 4 | 5.4 | 95.6 | 4.4 |
| 5 | 3.8 | 93.1 | 6.9 |
| 6 | 12.1 | 94.0 | 6.0 |
| 7 | 3.2 | 95.7 | 4.3 |
| 8 | 13.4 | 90.2 | 9.8 |
| 9 | 4.9 | 96.2 | 3.8 |
| 10 | 6.6 | 95.0 | 5.0 |

TABLE 3

| STEM-EDX Analysis of Catalyst (Ir content: 5 mol %) Prepared by NaBH$_4$ Reduction | | | |
|---|---|---|---|
| Measurement Points | Primary Particle Diameter (nm) | Composition Rh (mol %) | Ir (mol %) |
| 1 | 33.7 | 94.7 | 5.3 |
| 2 | 22.3 | 95.3 | 4.7 |
| 3 | 5.6 | 84.2 | 15.8 |
| 4 | 3.1 | 91.8 | 8.2 |
| 5 | 17.5 | 95.5 | 4.5 |
| 6 | 20.4 | 97.7 | 2.3 |
| 7 | 2.4 | 84.5 | 15.5 |
| 8 | 3.1 | 91.6 | 8.4 |
| 9 | 31.9 | 95.5 | 4.5 |
| 10 | 9.4 | 94.6 | 5.4 |

FIGS. 8 and 9 show the STEM-EDX analysis of Rh—Ir/SiO$_2$ (Ir content: 5 mol %) prepared by utilizing alcohol reduction and NaBH$_4$ reduction, respectively. Specifically, FIG. 8(a) shows a photograph by STEM-EDX of Rh—Ir/SiO$_2$ (Ir content: 5 mol %) prepared by utilizing alcohol reduction, and FIG. 8(b) shows the compositional ratio (mol %) of rhodium and iridium at specific measurement points 1 to 10 (analyzed under condition in which the spot size of an electron beam is 1 nm or less) in FIG. 8(a). Also, FIG. 9(a) shows a photograph by STEM-EDX of Rh—Ir/SiO$_2$ (Ir content: 5 mol %) prepared by utilizing NaBH$_4$ reduction, and FIG. 9(b) shows the compositional ratio (mol %) of rhodium and iridium at specific measurement points 1 to 10 (analyzed under condition in which the spot size of an electron beam is 1 nm or less) in FIG. 9(a).

Referring to FIGS. 8(a) and 9(a) and Tables 2 and 3, it can be confirmed that in the catalyst prepared by utilizing alcohol reduction, many smaller primary particles, especially many primary particles having a particle diameter of about 10 nm or less were formed, compared with the catalyst prepared by utilizing NaBH$_4$ reduction.

Next, explaining the compositional analysis by EDX, as is clear from the results in FIGS. 8(b) and 9(b) and Tables 2 and 3, it is understood that both rhodium and iridium elements are detected at all of the measurement points 1 to 10 in FIGS. 8(a) and 9(a). These results support the fact that a solid solution of rhodium and iridium was formed in both the catalyst by alcohol reduction and the catalyst by NaBH$_4$ reduction. In the catalyst by NaBH$_4$ reduction, the compositional ratio of rhodium and iridium was slightly varied (measurement points 1 to 10 in FIG. 9(b)), but in both the catalyst by alcohol reduction and the catalyst by NaBH$_4$ reduction, the iridium content at each measurement point was very consistent with the charging iridium content of 5 mol %.

In addition, in the catalyst prepared by utilizing NaBH$_4$ reduction, as seen from the results in Table 3, the average value of iridium contents at all of the measurement points 1 to 10 was 7.46 mol %. Therefore, a majority of all measurement points had an iridium content within the range of ±5 mol % relative to the average value. On the other hand, in the catalyst prepared by utilizing alcohol reduction, as seen from the results in Table 2, the average value of iridium contents at all of the measurement points 1 to 10 was 5.45 mol %. Therefore, all measurement points other than measurement point 8 had an iridium content within the range of ±2 mol % relative to the average value.

The STEM-EDX analysis results of FIGS. 8 and 9 agreed in the tendency with the XRD analysis results of FIG. 6. Furthermore, it was found from these analysis results that in both cases of using a reducing agent having a relatively weak reducing power, such as alcohol, and using a reducing agent having a relatively strong reducing power, such as NaBH$_4$, rhodium and iridium can form a solid solution, and in particular a more uniform and finer Rh—Ir bimetallic particles can be formed by alcohol reduction.

[Rh—Ir Supported Catalysts (Ir Content: 2 Mol %) Utilizing Alcohol Reduction]

Figure 10:
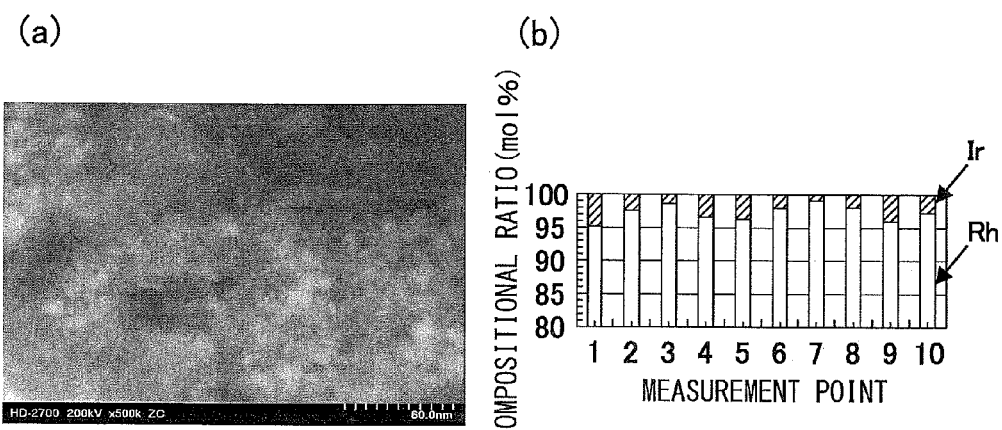
FIG. 10 shows the STEM-EDX analysis of Rh—Ir/SiO$_2$ (Ir content: 2 mol %) prepared by utilizing alcohol reduction.

Next, the exhaust purification catalyst by alcohol reduction that was found to bring about better analysis results was analyzed in the same manner by changing the Ir content. Specifically, the STEM-EDX analysis was performed in the same manner on the exhaust gas purification catalyst Rh—Ir/SiO$_2$ with an Ir content of 2 mol %. The results are shown in FIG. 10 and following Table 4. This exhaust gas purification catalyst was prepared in the same manner as in Example C, except that silica (SiO$_2$) was used as the catalyst support and the supported amount of the Rh—Ir bimetallic particles was changed to 2 wt %.

TABLE 4

STEM-EDX Analysis of Catalyst (Ir content: 2 mol %) Prepared by Alcohol Reduction

| Measurement Points | Primary Particle Diameter (nm) | Composition Rh (mol %) | Ir (mol %) |
|---|---|---|---|
| 1 | 7.2 | 95.2 | 4.8 |
| 2 | 4.2 | 97.6 | 2.4 |
| 3 | 3.8 | 98.6 | 1.4 |
| 4 | 6.4 | 96.6 | 3.4 |
| 5 | 3.7 | 96.3 | 3.7 |
| 6 | 6.1 | 98.0 | 2.0 |
| 7 | 2.6 | 99.1 | 0.9 |
| 8 | 4.7 | 98.1 | 1.9 |
| 9 | 9.8 | 96.0 | 4.0 |
| 10 | 6.6 | 97.3 | 2.7 |

FIG. 10 shows the STEM-EDX analysis of Rh—Ir/SiO$_2$ (Ir content: 2 mol %) prepared by utilizing alcohol reduction. Specifically, FIG. 10(a) shows a photograph by STEM-EDX of Rh—Ir/SiO$_2$ (Ir content: 2 mol %) prepared by utilizing alcohol reduction, and FIG. 10(b) shows the compositional ratio (mol %) of rhodium and iridium at specific measurement points 1 to 10 (analyzed under condition in which the spot size of an electron beam is 1 nm or less) in FIG. 10(a).

Referring to FIG. 10(a) and Table 4, it can be confirmed that similarly to the exhaust gas purification catalyst with an Ir content of 5 mol %, many smaller primary particles, especially many primary particles having a particle diameter of about 10 nm or less were formed. In addition, as is clear from the results in FIG. 10(b) and Table 4, both rhodium and iridium elements were detected at all of the measurement points 1 to 10 in FIG. 10(a), and the iridium content at each measurement point was very consistent with the charging iridium content of 2 mol %. As seen from the results in Table 4, the average value of iridium contents at all of the measurement points 1 to 10 was 2.7 mol %. Therefore, all measurement points other than measurement point 1 had an iridium content within the range of ±2 mol % relative to the average value.

[Rh—Ir Supported Catalysts (Ir Content: 10 Mol %) Utilizing Alcohol Reduction (Reference Example)]

Figure 11:
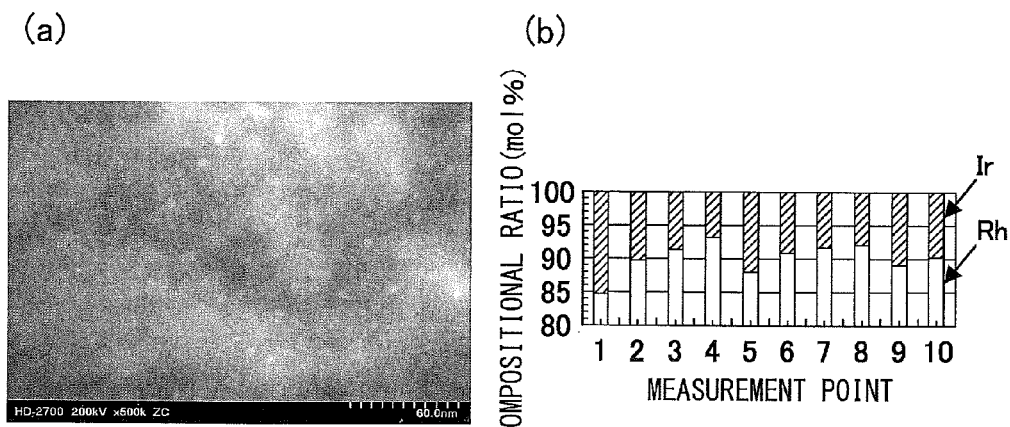
FIG. 11 shows the STEM-EDX analysis of Rh—Ir/SiO$_2$ (Ir content: 10 mol %) prepared by utilizing alcohol reduction.

Next, as Reference Example, the STEM-EDX analysis was performed in the same manner on the exhaust gas purification catalyst Rh—Ir/SiO$_2$ with an Ir content of 10 mol %, where formation of a solid solution of rhodium and iridium was not confirmed by the X-ray diffraction (XRD) analysis. The results are shown in FIG. 11 and following Table 5. This exhaust gas purification catalyst was prepared in the same manner as in Example D, except that silica (SiO$_2$) was used as the catalyst support and the supported amount of the Rh—Ir bimetallic particles was changed to 2 wt %.

TABLE 5

STEM-EDX Analysis of Catalyst (Ir content: 10 mol %) Prepared by Alcohol Reduction

| Measurement Points | Primary Particle Diameter (nm) | Composition Rh (mol %) | Ir (mol %) |
|---|---|---|---|
| 1 | 3.9 | 84.7 | 15.3 |
| 2 | 5.2 | 89.7 | 10.3 |
| 3 | 3.6 | 91.4 | 8.6 |
| 4 | 3.8 | 93.2 | 6.8 |
| 5 | 2.2 | 88.1 | 11.9 |
| 6 | 4.8 | 90.9 | 9.1 |
| 7 | 2.9 | 91.7 | 8.3 |

TABLE 5-continued

STEM-EDX Analysis of Catalyst (Ir content:
10 mol %) Prepared by Alcohol Reduction

| Measurement Points | Primary Particle Diameter (nm) | Composition | |
|---|---|---|---|
| | | Rh (mol %) | Ir (mol %) |
| 8 | 6.0 | 92.1 | 7.9 |
| 9 | 7.5 | 89.1 | 10.9 |
| 10 | 3.0 | 90.2 | 9.8 |

FIG. 11 shows the STEM-EDX analysis of Rh—Ir/SiO$_2$ (Ir content: 10 mol %) prepared by utilizing alcohol reduction. Specifically, FIG. 11(a) shows a photograph by STEM-EDX of Rh—Ir/SiO$_2$ (Ir content: 10 mol %) prepared by utilizing alcohol reduction, and FIG. 11(b) shows the compositional ratio (mol %) of rhodium and iridium at specific measurement points 1 to 10 (analyzed under condition in which the spot size of an electron beam is 1 nm or less) in FIG. 11(a).

Referring to FIG. 11(a) and Table 5, it can be confirmed that similarly to the exhaust gas purification catalyst with an Ir content of 5 mol % or 2 mol %, many smaller primary particles, especially many primary particles having a particle diameter of about 10 nm or less were formed. In addition, as seen from the results in Table 5, the average value of iridium contents at all of the measurement points 1 to 10 was 9.9 mol %. Therefore, a majority of all measurement points had an iridium content within the range of ±3 mol % relative to the average value.

DESCRIPTION OF REFERENCE NUMERALS

10: Bimetallic particles
11: Rh$_2$O$_3$
12: IrO$_2$
13: IrO$_x$
14: Rh
15: Ir
20: Exhaust gas purification catalyst
21: Rh$^{3+}$ ions
22: Ir$^{4+}$ ions
23: Protecting agent
24: Complex
25: Catalyst support

The invention claimed is:

1. An exhaust gas purification catalyst, comprising a catalyst support and bimetallic particles supported thereon, wherein said bimetallic particles comprise an at least partial solid solution of rhodium and iridium and have a diffraction peak at 40.66°<2θ<41.07° in X-ray diffraction with a CuKα ray.

2. The exhaust gas purification catalyst as claimed in claim 1, wherein said bimetallic particles have an iridium content of greater than 0 mol % but less than 10 mol % based on all metal elements contained in said bimetallic particles.

3. The exhaust gas purification catalyst as claimed in claim 2, wherein said bimetallic particles have an iridium content of 0.5 mol % or more but 5 mol % or less based on all metal elements contained in said bimetallic particles.

4. The exhaust gas purification catalyst as claimed in claim 1, wherein when said bimetallic particles are analyzed using a scanning transmission electron microscope equipped with an energy dispersive X-ray analyzer (STEM-EDX) under condition in which the spot size of an electron beam is 1 nm or less, the average value of iridium contents at randomly selected 10 or more measurement points is greater than 0 mol % but less than 10 mol %.

5. The exhaust gas purification catalyst as claimed in claim 1, wherein when said bimetallic particles are analyzed using STEM-EDX under condition in which the spot size of an electron beam is 1 nm or less, both rhodium and iridium elements are detected at 70% or more of randomly selected 10 or more measurement points.

6. The exhaust gas purification catalyst as claimed in claim 1, wherein when said bimetallic particles are analyzed using STEM-EDX under condition in which the spot size of an electron beam is 1 nm or less, a majority of randomly selected 10 or more measurement points have an iridium content within the range of ±5 mol % relative to the average value of iridium contents at all measurement points.

7. The exhaust gas purification catalyst as claimed in claim 6, wherein 70% or more of randomly selected 10 or more measurement points have an iridium content within the range of ±3 mol % relative to the average value of iridium contents at all measurement points.

8. The exhaust gas purification catalyst as claimed in claim 6, wherein said iridium content is within the range of ±2 mol % relative to the average value of iridium contents at all measurement points.

9. The exhaust gas purification catalyst as claimed in claim 1, wherein said bimetallic particles have an average primary particle diameter of greater than 0 nm but 10 nm or less.

10. The exhaust gas purification catalyst as claimed in claim 1, wherein said bimetallic particles have a crystallite diameter of greater than 0 nm but 7 nm or less.

11. The exhaust gas purification catalyst as claimed in claim 10, wherein said bimetallic particles have a crystallite diameter of greater than 0 nm but 5 nm or less.

12. A method for producing the exhaust gas purification catalyst as claimed in claim 1, comprising:
heating a mixed solution containing a rhodium salt, an iridium salt and a reducing agent at a temperature sufficient to reduce rhodium and iridium, thereby producing bimetallic particles comprising an at least partial solid solution of rhodium and iridium; and
supporting the produced bimetallic particles on a catalyst support.

13. The method as claimed in claim 12, wherein said bimetallic particles have a diffraction peak at 40.66°<2θ<41.07° in X-ray diffraction with a CuKα ray.

14. The method as claimed in claim 12, wherein said reducing agent is selected from the group consisting of an alcohol; sodium borohydride, lithium hydride, ammonia borane, hydrazine, and combinations thereof.

15. The method as claimed in claim 14, wherein said reducing agent is alcohol.

16. The method as claimed in claim 12, wherein said mixed solution further contains a protecting agent.

17. The method as claimed in claim 12, wherein said mixed solution contains said rhodium salt and said iridium salt in amounts such that said bimetallic particles have an iridium content of greater than 0 mol % but less than 10 mol % based on all metal elements contained in said bimetallic particles.

18. The method as claimed in claim 17, wherein said mixed solution contains said rhodium salt and said iridium salt in amounts such that said bimetallic particles have an iridium content of 0.5 mol % or more but 5 mol % or less based on all metal elements contained in said bimetallic particles.

19. The method as claimed in claim 12, wherein said heating step is performed at a temperature of 70 to 160° C.

* * * * *